(12) United States Patent
Austin (10) Patent No.: US 9,811,989 B2
(45) Date of Patent: Nov. 7, 2017

(54) EVENT DETECTION SYSTEM (71) Applicant: The Boeing Company, Chicago, IL (US)

(72) Inventor: Thomas Robert Austin, Rancho Palos Verdes, CA (US)

(73) Assignee: THE BOEING COMPANY, Chicago, IL (US)

( * ) Notice: Subject to any disclaimer, the term of this patent is extended or adjusted under 35 U.S.C. 154(b) by 492 days.

(21) Appl. No.: 14/501,378

(22) Filed: Sep. 30, 2014

(65) Prior Publication Data
US 2017/0024986 A1 Jan. 26, 2017

(51) Int. Cl.
| | | |
|---|---|---|
| G08B 23/00 | (2006.01) |
| G08B 13/196 | (2006.01) |
| G08B 21/12 | (2006.01) |
| G08B 29/18 | (2006.01) |
| G06K 9/00 | (2006.01) |
| G08B 21/04 | (2006.01) |
| G06F 3/16 | (2006.01) |
| H04N 5/33 | (2006.01) |
| H04N 5/77 | (2006.01) |

(Continued)

(52) U.S. Cl.
CPC ......... G08B 13/19602 (2013.01); G06F 3/16 (2013.01); G06K 9/00288 (2013.01); G06K 9/00348 (2013.01); G06K 9/00771 (2013.01); G06K 9/00778 (2013.01); G06K 9/2018 (2013.01); G08B 21/0423 (2013.01); G08B 21/0476 (2013.01); G08B 21/12 (2013.01); G08B 29/188 (2013.01); H04N 5/33 (2013.01); H04N 5/772 (2013.01); H04N 7/181 (2013.01); G06K 2009/00738 (2013.01); G06T 2207/30108 (2013.01); G08B 21/10 (2013.01)

(58) Field of Classification Search
None
See application file for complete search history.

(56) References Cited

U.S. PATENT DOCUMENTS 6,028,626 A * 2/2000 Aviv .................. G06K 9/00771
348/152
8,305,441 B2 11/2012 Boghossian et al.
(Continued)

OTHER PUBLICATIONS

Lee, "New CCTV technology senses aggression from sound," BBC, BBC News: Technology, Oct. 2010, 2 pages, accessed Sep. 29, 2014. http://www.bbc.co.uk/news/technology-11654139.
(Continued)

*Primary Examiner* — Adolf Dsouza
(74) *Attorney, Agent, or Firm* — Yee & Associates, P.C.

(57) ABSTRACT

A method and apparatus for detecting an occurrence of an event of interest. The apparatus comprises a surveillance system, a detector, and an analyzer. The surveillance system monitors subjects within an environment to generate monitoring data. The detector detects a number of indicator instances exhibited by at least a portion of the subjects using the monitoring data. Each of the number of indicator instances is an instance of a corresponding event indicator in a set of pre-selected event indicators. The analyzer evaluates the number of indicator instances and additional information to determine whether at least a portion of the number of indicator instances meets an event detection threshold, thereby indicating a detection of an occurrence of an event of interest.

22 Claims, 7 Drawing Sheets

(51) Int. Cl.
    *H04N 7/18*     (2006.01)
    *G06K 9/20*     (2006.01)
    *G08B 21/10*     (2006.01)

(56) References Cited

U.S. PATENT DOCUMENTS

| | | | |
|---|---|---|---|
| 2008/0100704 A1* | 5/2008 | Venetianer | G06F 17/3079 348/143 |
| 2010/0052902 A1 | 3/2010 | Wu | |
| 2011/0169637 A1 | 7/2011 | Siegler, II et al. | |
| 2015/0378574 A1* | 12/2015 | Gallo | G06F 3/04842 707/736 |

OTHER PUBLICATIONS

Lipton et al., "Critical Asset Protection, Perimeter Monitoring, and Threat Detection Using Automated Video Surveillance," 36th Annual International Carnahan Conference on Security Technology, Oct. 2002, 11 pages.

Partial European Search Report, dated Mar. 9, 2016, regarding Application No. EP15180790.6, 6 pages.

* cited by examiner

EVENT DETECTION SYSTEM

BACKGROUND INFORMATION

1. Field

The present disclosure relates generally to event detection and, in particular, to a method for rapidly detecting the occurrence of an event of interest. Still more particularly, the present disclosure relates to a method, apparatus, and system for rapidly detecting the occurrence of an event of interest, such as the release of a hazardous material or a hazardous condition, based on subject indicators detected using a surveillance system.

2. Background

In certain situations, the occurrence of an event may cause subjects that are in proximity of the event to respond physiologically, psychologically, or both physiologically and psychologically. As one specific example, the release of a hazardous material into an area may cause one or more persons that are in that area to exhibit physiological reactions, psychological reactions, or both. The hazardous material may be, for example, from a chemical, biological, radiological, nuclear, or other type of source. In some cases, the hazardous material may be an explosive device, such as an explosive weapon, or a material released from the detonation of such a weapon.

The release of the hazardous material into the area may be accidental or intentional. For example, the hazardous material may be released as a result of the storage or transportation of industrial or technological materials. In another example, the hazardous material may be released by adversaries with hostile intent.

Oftentimes, exposure to a hazardous material, such as a hazardous chemical agent, a toxic industrial chemical, or an explosive device, may not be rapidly detectable by people or currently available detection systems. For example, exposure to the hazardous material may be covert and invisible and thus, not readily identifiable by people.

Further, many currently available chemical material detectors require direct contact with the hazardous material regardless of whether the hazardous material is airborne, waterborne, or foodborne. The time required for a cloud of unknown hazardous material to propagate from the point of initial release to the location of a chemical material detector may take minutes, tens of minutes, hours, or days in some cases.

In certain situations, the period of time between the initial release of a hazardous material in an area and the point in time at which a chemical material detector is able to detect the hazardous material may impede the ability to activate an alarm to alert persons within and around the impacted area, evacuate the impacted area, or dispatch emergency response personnel to the impacted area as quickly as desired. As the time of exposure to the hazardous material increases, the adverse effects on those persons exposed may progress rapidly and the number of persons exposed may increase rapidly, depending on the type of hazardous material that was released. These effects may have the potential to seriously and adversely impact the health, safety, and security of people and, in some cases, animals within and around the area of exposure, as well as the infrastructure of the area.

In addition to the release of a hazardous material, there may be other types of events of interest that may need to be detected rapidly. For example, it may be desirable to rapidly detect undesired events of interest so that action to address these undesired events may be quickly taken. Therefore, it would be desirable to have a method and apparatus that take into account at least some of the issues discussed above, as well as other possible issues.

SUMMARY

In one illustrative embodiment, an apparatus comprises a surveillance system, a detector, and an analyzer. The surveillance system monitors subjects within an environment to generate monitoring data. The detector analyzes the monitoring data to identify a number of indicator instances exhibited by at least a portion of the subjects. Each of the number of indicator instances is an instance of a corresponding event indicator in a set of pre-selected event indicators. The analyzer evaluates the number of indicator instances identified to determine whether at least a portion of the number of indicator instances meets an event detection threshold, thereby indicating a detection of an occurrence of an event of interest.

In another illustrative embodiment, a hazardous material detection system comprises a surveillance system, a detector, and an analyzer. The surveillance system monitors subjects within an environment to generate monitoring data. The detector detects a number of indicator instances exhibited by at least a portion of the subjects using the monitoring data. Each of the number of indicator instances is an instance of a corresponding event indicator in a set of pre-selected event indicators. The analyzer evaluates the number of indicator instances and additional information to determine whether at least a portion of the number of indicator instances meets an event detection threshold, thereby indicating a detection of a release of a hazardous material.

In yet another illustrative embodiment, a method for detecting an occurrence of an event of interest is provided. Subjects are monitored within an environment to generate monitoring data using a surveillance system. A number of indicator instances exhibited by at least a portion of the subjects are detected using the monitoring data. Each of the number of indicator instances is an instance of a corresponding event indicator in a set of pre-selected event indicators. The number of indicator instances is evaluated to determine whether at least a portion of the number of indicator instances meets an event detection threshold, thereby indicating a detection of a release of a hazardous material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have the capability of rapidly and autonomously detecting certain events of interest based on surveillance of the reactions of subjects to the occurrence of these events of interest. These subjects may include human subjects, animal subjects, plant subjects, or other types of live organisms. In particular, the illustrative embodiments recognize and take into account that it may be desirable to have the capability of rapidly detecting the release of a hazardous material, an exposure to a hazardous condition, or an exposure to some other type of undesired event in an environment based on the reactions of subjects in that environment to the undesired event.

The illustrative embodiments recognize and take into account that the physiological and psychological reactions of subjects exposed to events of interest may be responses that may be observed, felt, smelled, heard, sensed in some other manner, or experienced in some other manner. As one illustrative example, exposure to a hazardous material may cause one or more persons to exhibit behaviors that may be captured by an imaging system or an audio recording system. In another example, animals, such as trained detection canines, may exhibit behaviors that indicate the presence of hazardous material in an environment. For example, canines may exhibit certain behaviors in response to detecting drugs, explosive materials, certain types of wildlife, or some other type of substance. These canines may exhibit these behaviors instinctually or based on training. As yet another example, plants may exhibit behaviors that indicate exposure to certain substances. For example, plants exposed to certain types of gaseous, liquid, or solid substances may wilt. Further, the illustrative embodiments recognize and take into account that a system that uses identification of these types of behaviors by subjects to detect that a hazardous material has been released may perform this detection significantly more rapidly and, in some cases, more affordably than a chemical detection system that requires direct contact with the hazardous material.

Thus, the illustrative embodiments provide a method, apparatus, and system for rapidly, passively, and autonomously detecting an occurrence of an event of interest. In particular, subjects may be monitored within an area using a surveillance system. A number of indicator instances exhibited by at least a portion of the subjects may be detected using the surveillance system. The number of indicator instances may then be evaluated to determine whether at least a portion of the number of indicator instances meet an event detection threshold to establish a detection of an occurrence of the event of interest.

In one illustrative example, a hazardous material detection system is provided for detecting the release of hazardous materials. The hazardous material detection system may include a surveillance system, a detector, and an analyzer. The surveillance system may monitor subjects within an area to generate monitoring data. The detector may process this monitoring data to detect any instance of a pre-selected event indicator exhibited by one or more of the subjects. In this manner, the detector may detect a number of indicator instances. The analyzer may evaluate the number of indicator instances to determine whether at least a portion of the number of indicator instances meets an event detection threshold to establish a detection of a release of a hazardous material.

Figure 1:
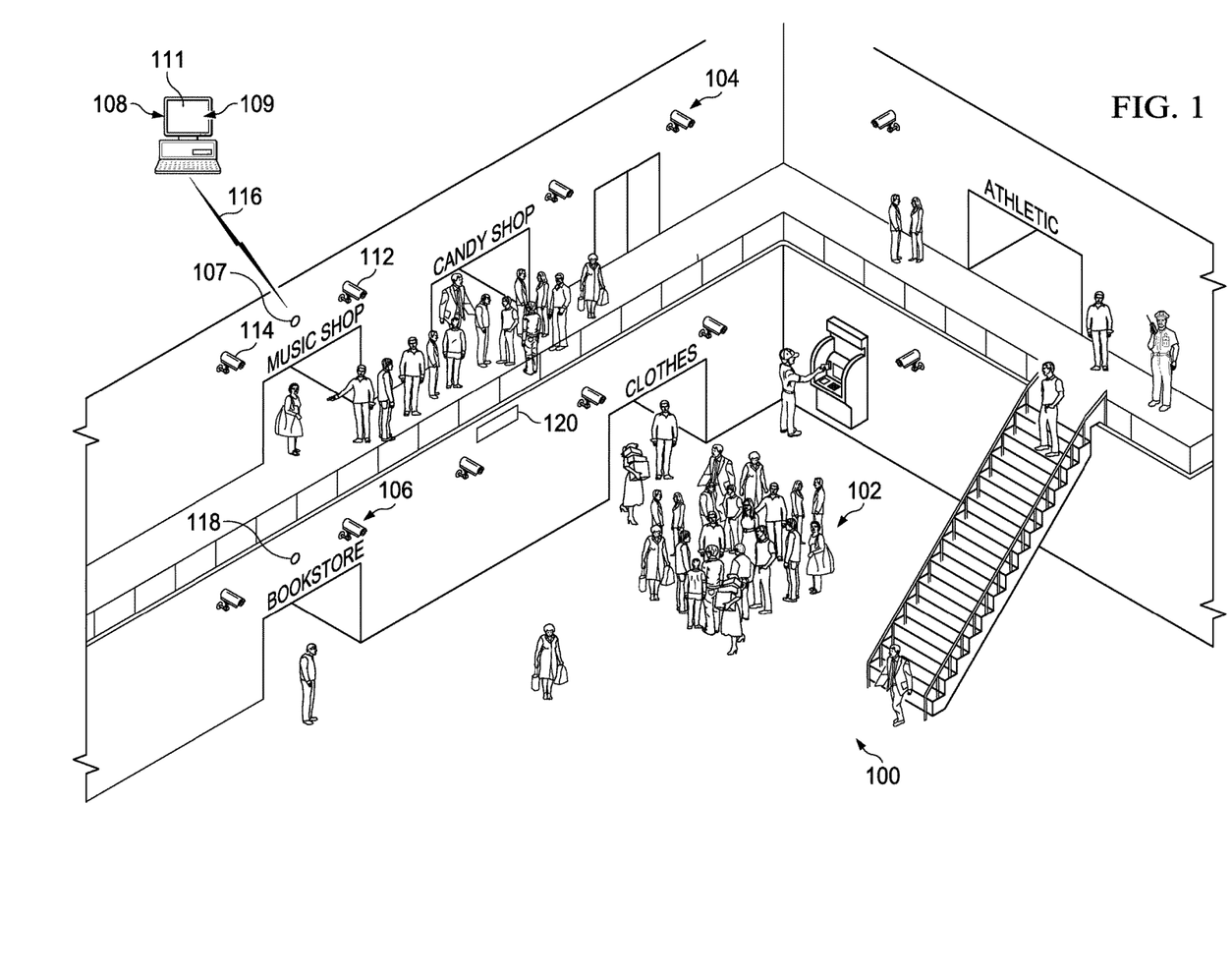
FIG. 1 is an illustration of a hazardous material detection system in a shopping mall in accordance with an illustrative embodiment.

Referring now to the figures and, in particular, with reference to FIG. 1, an illustration of a hazardous material detection system in a shopping mall is depicted in accordance with an illustrative embodiment. In this illustrative example, an interior view of shopping mall 100 with people 102 at shopping mall 100 is depicted.

In this illustrative example, hazardous material detection system 104 may be used to detect the release of hazardous materials inside shopping mall 100, around shopping mall 100, or in some location within the proximity of shopping mall 100. Hazardous material detection system 104 may include visual surveillance system 106, audio surveillance system 107, and computer system 108. Visual surveillance system 106 is used to monitor people 102 by generating imaging data of shopping mall 100 and the areas near shopping mall 100 and thereby, people 102 in shopping mall 100. Visual surveillance system 106 includes plurality of imaging systems 112. Each of plurality of imaging systems 112 may generate imaging data for a corresponding portion of shopping mall 100 or an area around or near shopping mall 100.

In this illustrative example, each of plurality of imaging systems 112 takes the form of an electro-optical (EO) video camera. However, in other examples, plurality of imaging systems 112 may be implemented using infrared camera systems, ultraviolet camera systems, or other types of imaging systems.

Visual surveillance system 106 may wirelessly send imaging data to computer system 108 for analysis. For example, imaging system 114 of plurality of imaging systems 112 may send imaging data to computer system 108 using wireless communications link 116. The imaging data may be in the form of, for example, video data streams.

Audio surveillance system 107 includes plurality of audio recording devices 118. Plurality of audio recording devices 118 may monitor people 102 and record audio data of sounds, noises, and audible expressions by people 102 inside, around, and near shopping mall 100. Audio surveillance system 107 may wirelessly send this audio data to computer system 108 for analysis.

In this illustrative example, computer system 108 maybe configured for the special purpose of detecting the release of a hazardous material inside, around, or near shopping mall 100 using the imaging data received from visual surveillance system 106 and the audio data received from audio surveillance system 107. Computer system 108 may include both detector 109 and analyzer 111.

In particular, detector 109 may rapidly detect any behaviors exhibited by people 102 that may indicate a possible exposure to a hazardous material. For example, detector 109 may analyze the imaging data and audio data to detect instances of pre-selected event indicators that may potentially indicate that a release of a hazardous material has occurred. These pre-selected event indicators may be indicators that have been established as known reactions or responses to the release of a hazardous material. These pre-selected event indicators may include reactions such as, for example, without limitation, changes in ambulatory mannerisms, changes in facial gestures, changes in pedestrian traffic flow, coughing, choking, loud yelling, screaming, crying, other types of behaviors, or some combination thereof.

Analyzer 111 may use the detection of any combination of these human reactions along with additional background information to rapidly determine whether a hazardous material has been released inside, around, or near shopping mall 100. This additional background information may include information about, for example, without limitation, the time, date, weather conditions, past patterns of human reactions with respect to shopping mall 100, other types of information, or some combination thereof.

Analyzer 111 may evaluate any indicator instances detected and the additional background information with respect to a set of criteria to determine whether at least a portion of the indicator instances meets an event detection threshold, thereby indicating that a hazardous material has been released. The set of criteria may include, for example, without limitation, that a certain number of the indicator instances detected occurred within a selected period of time, that a certain number of the indicator instances detected occurred within a certain distance relative to each other, that a certain number of indicator instances were detected for each of multiple pre-selected event indicators, or some combination thereof.

In this illustrative example, a determination by analyzer 111 that a hazardous material has been released inside, around, or near shopping mall 100 may trigger alarm system 120. In particular, alarm system 120 may be immediately triggered such that emergency response personnel may be quickly dispatched to shopping mall 100, evacuation of shopping mall 100 may be initiated, or some combination thereof. In other illustrative examples, a determination by analyzer 111 that a hazardous material has been released inside, around, or near shopping mall 100 may result in an alert being generated immediately.

Figure 2:
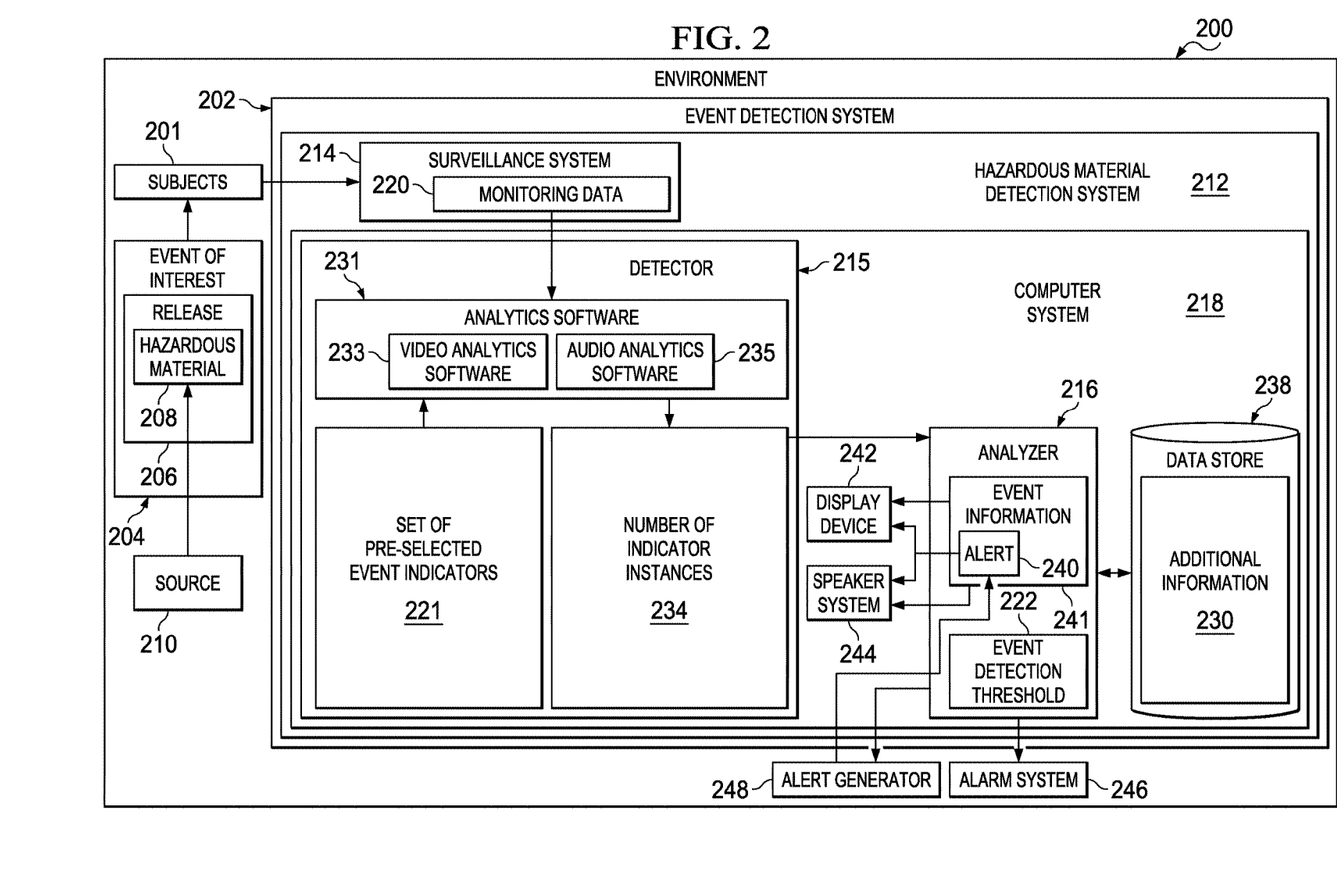
FIG. 2 is an illustration of an environment and an event detection system for detecting events of interest that occur inside or in the proximity of the environment in the form of a block diagram in accordance with an illustrative embodiment.

With reference now to FIG. 2, an illustration of an environment and an event detection system for detecting events of interest that occur inside or in the proximity of the environment is depicted in the form of a block diagram in accordance with an illustrative embodiment. In this illustrative example, environment 200 includes subjects 201 and event detection system 202. Shopping mall 100 and people 102 in FIG. 1 may be an example of one implementation for environment 200 and subjects 201, respectively, in FIG. 2.

Environment 200 may take a number of different forms. For example, without limitation, environment 200 may take the form of a shopping mall, an airport, a factory, a manufacturing facility, a maintenance facility, a chemical plant, a nuclear plant, a laboratory, a biological research facility, an athletic stadium, an auditorium, a school, a university, a laboratory, a hotel, a convention center, a mass transit station, a parking lot, a garage, an office building, a dormitory, an apartment complex, an outdoor public event, or some other type of building or environment. In some cases, environment 200 may include an inside of a building or structure, an area around the building or structure, an area located in proximity of the building or structure, or some combination thereof. In this manner, environment 200 may be open to the outdoors or natural elements, enclosed, partially enclosed, or some combination thereof.

Subjects 201 may include organisms. For example, without limitation, subjects 201 may include people, animals, plants, one or more other types of organisms, or some combination thereof. In other illustrative examples, subjects 201 may include vehicles, robotic vehicles, unmanned aerial vehicles, police vehicles, emergency response vehicles, aircraft, a number of celestial bodies, meteoroids, or other types of subjects.

Event detection system 202 may be capable of detecting the occurrence of event of interest 204 inside or in the proximity of environment 200 based on the reactions of subjects 201 to event of interest 204. Event of interest 204 may take a number of different forms, depending on the implementation. Event of interest 204 may be an undesired event of interest.

In one illustrative example, event of interest 204 takes the form of release 206 of hazardous material 208. Release 206 may be an accidental or intentional release of hazardous material 208. Hazardous material 208 may be released from source 210. Source 210 may be, for example, without limitation, a chemical source, a radiological source, a biological source, a nuclear source, a weapon, an explosive device, or some other type of source. In some cases, source 210 may be a device, system, or infrastructure that is off-gassing hazardous material 208 as a result of the device, system, or infrastructure deteriorating.

Hazardous material 208 may take the form of, for example, without limitation, a hazardous chemical agent, a hazardous biological agent, a toxic industrial chemical material, a toxic chemical waste material, a toxic gas, or some other type of hazardous material. In some illustrative examples, release 206 of hazardous material 208 may take the form of the deployment of or the placing of an explosive device, such as an explosive weapon, or the use of one or more firearms inside or in the proximity of environment 200.

When event of interest 204 takes the form of release 206 of hazardous material 208, event detection system 202 may be referred to as hazardous material detection system 212. Hazardous material detection system 104 in FIG. 1 may be an example of one implementation for hazardous material detection system 212.

Alternatively, event of interest 204 may take some other form. For example, without limitation, event of interest 204 may take the form of an undesired condition, a weather condition or event such as lightning or hail, an environmental event or condition, an event involving the use of a weapon such as a firearm, a lightning event such as the rapid flashing of lights, a visual potential threat, an audible potential threat, a natural event such as an earthquake, a natural event such as hail, or some other type of event.

Figure 3:
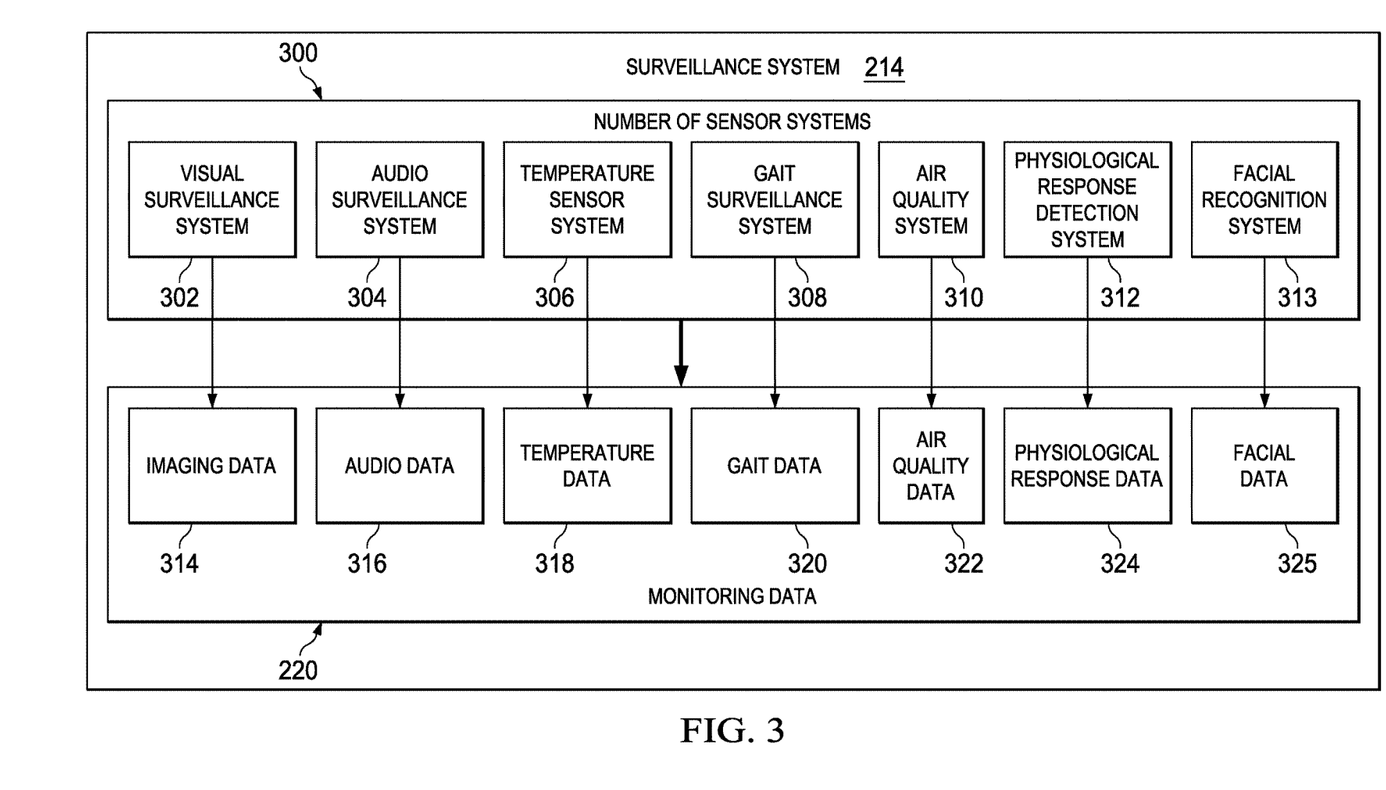
FIG. 3 is an illustration of a surveillance system in the form of a block diagram in accordance with an illustrative embodiment.

As depicted, event detection system 202 may include surveillance system 214, detector 215, and analyzer 216. An example of one implementation for surveillance system 214 is depicted in FIG. 3 below.

In this illustrative example, each of detector 215 and analyzer 216 may be implemented in software, hardware, firmware, or a combination thereof. When software is used, the operations performed by detector 215, analyzer 216, or both may be implemented using, for example, without limitation, program code configured to run on a processor unit. When firmware is used, the operations performed by detector 215, analyzer 216, or both may be implemented using, for example, without limitation, program code and data and stored in persistent memory to run on a processor unit.

When hardware is employed, the hardware may include one or more circuits that operate to perform the operations performed by detector 215, analyzer 216, or both. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by detector 215, analyzer 216, or both may be performed using organic components integrated with inorganic components. In some cases, the operations and processes may be performed by entirely organic components, excluding a human being. As one illustrative example, circuits in organic semiconductors may be used to perform these operations and processes.

In this illustrative example, both detector 215 and analyzer 216 may be implemented using computer system 218. Computer system 218 may include one or more computers. When computer system 218 includes multiple computers, these computers may be in communication with each other. Computer system 108 in FIG. 1 may be an example of one implementation for computer system 218 respectively. Detector 109 and analyzer 111 in FIG. 1 may be examples of implementations for detector 215 and analyzer 216 in FIG. 2.

Surveillance system 214 may monitor subjects 201 within environment 200 to generate monitoring data 220. Examples of different types of data that may be included in monitoring data 220 are described in FIG. 3 below.

Surveillance system 214 sends monitoring data 220 to detector 215 for analysis. As one illustrative example, surveillance system 214 may send monitoring data 220 to detector 215 using any number of wired communications links, wireless communications links, optical communications links, or other type of communications links.

Detector 215 may process monitoring data 220 as monitoring data 220 is received from surveillance system 214 without significant delay. In other words, detector 215 may be configured to process monitoring data 220 in "real-time" or "near real-time."

Detector 215 may process monitoring data 220 to determine whether any instances of one or more of set of pre-selected event indicators 221 may be detected within environment 200 using monitoring data 220. Each of set of pre-selected event indicators 221 may be an established or known reaction or response to event of interest 204. When event of interest 204 is release 206 of hazardous material 208, set of pre-selected event indicators 221 may include, for example, without limitation, human reactions that are known to be exhibited by persons who have been exposed to hazardous material 208.

In one illustrative example, set of pre-selected event indicators 221 may be stored in a data store in computer system 218. In another illustrative example, set of pre-selected event indicators 221 may be stored independently of computer system 218. Detector 215 may be configured to, for example, without limitation, retrieve or access detector 215 set of pre-selected event indicators 221 wirelessly.

Each of set of pre-selected event indicators 221 may be a reaction or response that is physical, physiological, psychological, or some combination thereof. A reaction may be physiological if it involves at least one of the organ systems, organs, cells, or bio-molecules that carry out the chemical or physical functions of the subject. A reaction may be psychological if it involves at least one mental function or mental behavior. In some cases, a reaction may be both physiological and psychological. For example, a person crying may be a reaction that is considered both psychological and physiological. An example of a scheme within which set of pre-selected event indicators 221 may be organized is described in FIG. 4 below. Further, examples of the different types of event indicators that may be included in set of pre-selected event indicators 221 is described in FIG. 4 below.

As used herein, the phrase "at least one of," when used with a list of items, means different combinations of one or more of the listed items may be used and only one of the items in the list may be needed. The item may be a particular object, thing, action, process, or category. In other words, "at least one of" means any combination of items or number of items may be used from the list, but not all of the items in the list may be required.

For example, "at least one of item A, item B, or item C" or "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Detector 215 may use monitoring data 220 to detect number of indicator instances 234 exhibited by at least a portion of subjects 201 in environment 200. As used herein, a "number of" items may include one or more items. In this manner, number of indicator instances 234 may include one or more indicator instances. An indicator instance in number of indicator instances 234 may be an instance of a corresponding event indicator in set of pre-selected event indicators 221 that is exhibited by one or more of subjects 201. In this manner, each of number of indicator instances 234 that is detected using monitoring data 220 may potentially signal that event of interest 204 has occurred.

In some cases, multiple instances of a pre-selected event indicator may be detected. In other cases, multiple instances of each of multiple pre-selected event indicators may be detected. Further, one of subjects 201 may be capable of exhibiting one or more of pre-selected event indicators 221 such that multiple indicator instances may be attributed to that subject.

In one illustrative example, detector 215 may be implemented using analytics software 231. Analytics software 231 may take the form of smart analytics software, which may also be referred to as intelligent analytics software. Analytics software 231 may include, for example, without limitation, at least one of video analytics software 233, audio analytics software 235, other types of analytics software, or some combination thereof.

Video analytics software 233 may be capable of identifying specific types of visual imagery, patterns, and motions. For example, video analytics software 233 may be trained to search for visual patterns and motions using monitoring data 220 to identify whether any instances of one or more of set of pre-selected event indicators 221 can be detected.

Similarly, audio analytics software 235 may be capable of identifying specific types of aural patterns, speech patterns, and sounds. Audio analytics software 235 may be trained to search for aural patterns, speech patterns, sounds, or some combination thereof using monitoring data 220 to identify whether any instances of one or more of set of pre-selected event indicators 221 can be detected.

In this manner, analytics software 231 may be trained to search for patterns and other clues in monitoring data 220 that may establish a detection of an instance of any one or more of set of pre-selected event indicators 221. Analytics software 231 may be capable of analyzing monitoring data 220 in substantially real-time such that number of indicator instances 234 may be identified without significant delay.

Once number of indicator instances 234 has been identified by detector 215, analyzer 216 may evaluate number of indicator instances 234 without significant delay to determine whether at least a portion of number of indicator instances 234 meets event detection threshold 222, thereby indicating that event of interest 204 has occurred. Number of indicator instances 234 may meet event detection threshold 222 by exactly satisfying the requirements needed to meet event detection threshold 222 or exceeding the requirements needed to satisfy event detection threshold 222.

Event detection threshold 222 may be defined in a number of different ways. In one illustrative example, event detection threshold 222 may be defined by, for example, without limitation, an algorithm that sorts, ranks, and evaluates number of indicator instances 234 according to a set of criteria to determine whether event detection threshold 222 has been met. In another illustrative example, event detection threshold 222 may be defined as some minimum number of subjects 201 being associated with number of indicator instances 234. For example, 5, 10, or 20 subjects may be the minimum number of subjects required to be associated with number of indicator instances 234 to meet event detection threshold 222.

In some illustrative examples, certain ones of set of pre-selected event indicators 221 may be weighted higher than others such that, for example, at least one instance of a particular pre-selected event indicator may be sufficient to meet event detection threshold 222, while at least five instances of another pre-selected event indicator may be sufficient to meet event detection threshold 222. As one illustrative example, vomiting and sneezing may be both pre-selected event indicators. However, an instance of vomiting may be weighted higher than an instance of sneezing.

In still other illustrative examples, event detection threshold 222 may be defined as requiring that some number of indicator instances occur within close temporal or physical proximity relative to each other. For example, 10 instances of subjects falling down detected over the course of 5 days may not meet event detection threshold 222 but 4 instances of subjects falling down detected over a span of about 10 minutes may be sufficient to meet event detection threshold 222. As another example, 8 instances of subjects falling down detected over an area of about 100 feet in diameter may not meet event detection threshold 222 but 3 instances of subjects falling down detected within an area of about 20 feet in diameter may be sufficient to meet event detection threshold 222.

In this manner, any combination of criteria and factors may be used to define event detection threshold 222. Event of interest 204 may only be considered "detected" when at least a portion of number of indicator instances 234 meets event detection threshold 222.

Further, in some illustrative examples, analyzer 216 may also use additional information 230 to determine whether event detection threshold 222 has been met. Additional information 230 may be stored in data store 238. Data store 238 may take the form of a number of databases or some other type of data storage or data structure. In this illustrative example, data store 238 is stored on computer system 218. However, in other illustrative examples, data store 238 may be stored on some other computer system or server computer located remotely. In these examples, analyzer 216 may be capable of accessing data store 238 using any number of wired, wireless, optical, or other types of communications links.

Additional information 230 may include information that can be used to determine whether number of indicator instances 234 meets event detection threshold 222. Additional information 230 may include, for example, without limitation, at least one of time and date information, geospatial location information, weather information, historical information, other types of information, or some combination thereof.

The weather information may include, for example, without limitation, wind magnitude, wind direction, temperature, humidity, precipitation, ultraviolet index, dew point, visibility, and other types of weather information. The historical information may include, for example, historical behavioral patterns, historical patterns of human indicators, historical pedestrian traffic flow, historical densities of pedestrian flow, and other types of historical information.

In one illustrative example, meeting event detection threshold 222 may require that a set of criteria for number of indicator instances 234 be met and a set of criteria for additional information 230 be met. For example, event detection threshold 222 may be defined as requiring that at least 10 instances of falling down occur within an area having a diameter of about 10 feet and within a ten-minute period of time and that weather conditions indicate that the temperature is below 110 degrees Fahrenheit. In some cases, additional information 230 may include historical information that may be used to determine whether event detection threshold 222 is met.

In one illustrative example, analyzer 216 may trigger alarm system 246 without significant delay once event detection threshold 222 has been met. In this example, alarm system 246 may be separate from event detection system 202. However, in other illustrative examples, alarm system 246 may be part of event detection system 202.

Alarm system 246 may take the form of a visual alarm system, an audible alarm system, a visual and audible alarm system, or some other type of alarm system. As one illustrative example, in response to determining that release 206 of hazardous material 208 has occurred, analyzer 216 may immediately trigger the activation of alarm system 246 such that an alarm light pattern is displayed and an alarm sound is played in environment 200.

In some illustrative examples, analyzer 216 may generate event information 241 without significant delay in response to a determination that event of interest 204 has occurred based on number of indicator instances 234 and additional information 230. Event information 241 may be actionable information about event of interest 204. Event information 241 may include, for example, alert 240, which may be generated immediately after the detection of the occurrence of event of interest 204.

Alert 240 may take the form of, for example, without limitation, a visual alert, an audible alert, an alert message, or some other type of alert, depending on the implementation. For example, alert 240 may be a visual alert that may be displayed on display device 242. In another example, alert 240 may be an audible alert that is played on speaker system 244. In yet another example, alert 240 may be an alert message that is sent to another computer system. The alert message may be textual, graphical, symbolic, or some other type of alert message. In some cases, alert 240 may be both visual and audible.

In some illustrative examples, alert 240 may be generated by alert generator 248. Alert generator 248 may be separate from event detection system 202 in some illustrative examples. For example, without limitation, alert generator 248 may be part of an emergency response system, a police notification system, a medical dispatch system, a city monitoring system, a state monitoring system, a national monitoring system, or some other type of system. In these cases, analyzer 216 may rapidly send a message to alert generator 248 in response to a detection of the occurrence of event of interest 204. In response to receiving this message, alert generator 248 may immediately generate alert 240 in a manner that may enable suitable personnel to take action without significant delay. In other illustrative examples, alert generator 248 may be part of event detection system 202.

In other illustrative examples, event information 241 may include, for example, without limitation, a geospatial location of the particular area within environment 200 impacted by event of interest 204, at least a portion of monitoring data 220 corresponding to the current and recent activity of persons within the impacted area, and other information. In some cases, event information 241 may include information that may be displayed remotely on a display device for use by emergency response personnel. This information may include, for example, without limitation, an area within environment 200 within which event of interest 204 was detected, a number of subjects 201 affected by event of interest 204, and a time at which the detection of event of interest 204 occurred, which may be the time at which event detection threshold 222 was met.

Thus, event detection system 202 may provide rapid detection of and information about the occurrence of event of interest 204. When event of interest 204 is release 206 of hazardous material 208, hazardous material detection system 212 may provide detection of release 206 that may be much quicker as compared to detection of hazardous material 208 using, for example, a chemical material detector attached to a vent system, environmental control system, or facility heating, ventilating, and air conditioning (HVAC) system of environment 200. In this manner, alert 240 may be generated or alarm system 246 may be triggered immediately in response to the detection of release 206 of hazardous material 208 such that emergency response personnel may be dispatched more quickly and the area of environment 200 impacted by release 206 may be evacuated more quickly.

Further, using hazardous material detection system 212 may reduce the costs associated with the detection of hazardous materials because expensive chemical material detectors may not be needed. In some cases, costs may also be reduced in that existing surveillance systems in environment 200 may be utilized to generate monitoring data 220. In other words, detector 215 and analyzer 216 may be retrofitted to existing surveillance systems. Further, using multiple imaging systems to implement surveillance system 214 may enable redundancy such that one or more of these imaging systems operating outside of selected tolerances may not affect the overall ability of hazardous material detection system 212 to rapidly detect release 206 of hazardous material 208.

Hazardous material detection system 212 may be used to passively and autonomously observe subject behaviors and function as a substantially real-time tripwire or trigger to inform decision makers that release 206 of hazardous material 208 has occurred. In this manner, hazardous material detection system 212 may reduce the potential for adverse effects to the health, safety, and security of subjects 201 and environment 200.

With reference now to FIG. 3, an illustration of surveillance system 214 from FIG. 2 is depicted in the form of a block diagram in accordance with an illustrative embodiment. As depicted, surveillance system 214 may include number of sensor systems 300 that generate monitoring data 220. Number of sensor systems 300 may include at least one of visual surveillance system 302, audio surveillance system 304, temperature sensor system 306, gait surveillance system 308, air quality sensor system 310, physiological response detection system 312, and facial recognition system 313.

Visual surveillance system 106 in FIG. 1 may be an example of one implementation for visual surveillance system 302 in FIG. 3. Visual surveillance system 302 may include at least one of an imaging system, a video camera, an electro-optical imaging system, an infrared imaging system, an ultraviolet imaging system, or some other type of imaging system.

Audio surveillance system 107 in FIG. 1 may be an example of one implementation for audio surveillance system 304 in FIG. 3. Audio surveillance system 304 may include at least one of an acoustic transducer, a microphone, or some other type of audio recording device.

Temperature sensor system 306 may include any number of temperature sensor devices that are capable of monitoring temperatures inside environment 200, temperatures around environment 200, or temperatures of subjects 201. Gait surveillance system 308 may be used to monitor the gait of subjects 201 walking inside environment 200, around environment 200, or both. Gait surveillance system 308 may include any number of imaging systems, other types of sensor systems, or both. Air quality sensor system 310 may be used to monitor the air quality inside environment 200, around environment 200, or both.

Physiological response detection system 312 may include any number of sensor devices that are capable of detecting physiological responses. Physiological response detection system 312 may include, for example, personal health monitoring systems and medical monitoring systems. As one illustrative example, physiological response detection system 312 may be used to measure pupil dilation. Facial recognition system 313 may be capable of recognizing at least one of the facial features, facial gestures, or facial expressions of subjects 201 in FIG. 2.

As depicted, surveillance system 214 generates monitoring data 220. Monitoring data 220 may include at least one of imaging data 314, audio data 316, temperature data 318, gait data 320, air quality data 322, physiological reaction data 324, and facial data 325. In one illustrative example, visual surveillance system 302, audio surveillance system 304, temperature sensor system 306, gait surveillance system 308, air quality sensor system 310, physiological response detection system 312, and facial recognition system 313 may generate imaging data 314, audio data 316, temperature data 318, gait data 320, air quality data 322, physiological reaction data 324, and facial data 325 respectively. In some cases, audio data 316 may be generated by both visual surveillance system 302 and audio surveillance system 304.

Figure 4:
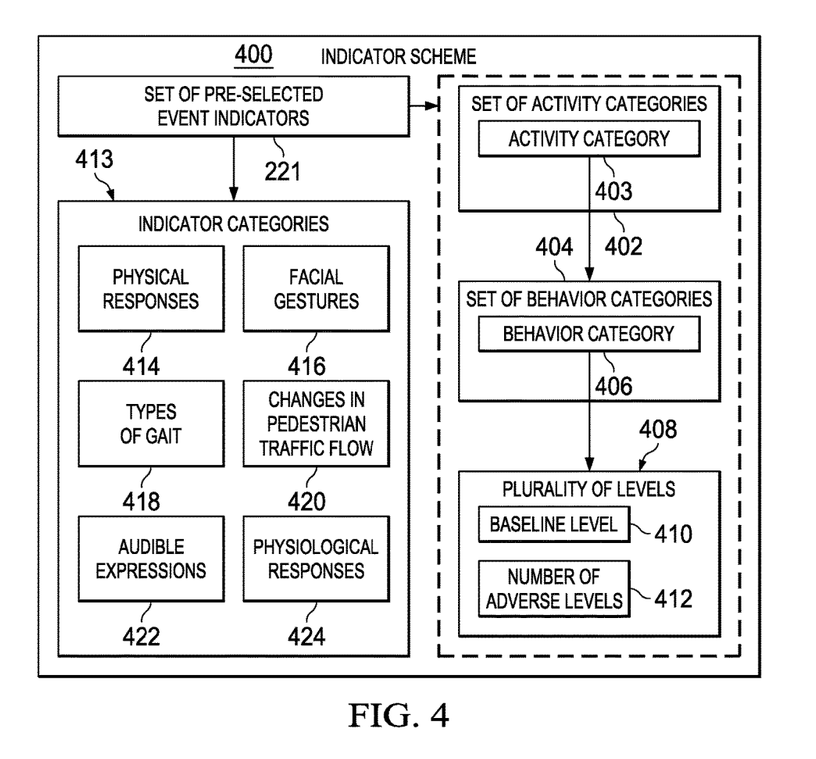
FIG. 4 is an illustration of an indicator scheme in the form of a block diagram in accordance with an illustrative embodiment.

With reference now to FIG. 4, an illustration of an indicator scheme is depicted in the form of a block diagram in accordance with an illustrative embodiment. In this illustrative example, indicator scheme 400 may be used for set of pre-selected event indicators 221 from FIG. 2. In particular, set of pre-selected event indicators 221 may be logically organized according to indicator scheme 400.

As depicted, indicator scheme 400 may include set of activity categories 402. Each of set of activity categories 402 may be a type of activity that may be monitored using surveillance system 214 described in FIGS. 2-3. Set of activity categories 402 may include, for example, without limitation, at least one of walking, queuing, audience listening, checkpoint inspection, shopping, observing signage, using kiosk stations, or some other type of activity category.

Each of set of activity categories 402 may be associated with a set of behavior categories 404. For example, activity category 403 may be associated with set of behavior categories 404. Set of behavior categories 404 may be the particular behaviors associated with the corresponding activity category 403 that may be impacted by event of interest 204 in FIG. 2.

For example, when activity category 403 is walking, set of behavior categories 404 may include the following: vocalizations of subjects walking, walking speed, and direction of motion of subjects. When activity category 403 is queuing, set of behavior categories 404 may include the following: vocalizations, speed of pedestrian traffic flow, body position, and direction of motion.

In some cases, a particular behavior category in set of behavior categories 404 may be impacted by varying degrees of adverse consequences ranging from harmless to harmful to life and general well-being. Behavior category 406 may be an example of one of set of behavior categories 404. Behavior category 406 may be associated with plurality of levels 408. Plurality of levels 408 may include baseline level 410 and number of adverse levels 412.

Baseline level 410 may correspond to the typical or normal decisions and actions associated with behavior category 406 with respect to activity category 403. Number of adverse levels 412 may correspond to the atypical or abnormal decisions and actions associated with behavior category 406 with respect to activity category 403. In this manner, plurality of levels 408 may capture the varying degrees of adverse consequences to behavior category 406 ranging from harmless to harmful to life and general well-being as a result of event of interest 204 in FIG. 2.

For example, when activity category 403 is queuing and behavior category 406 is a speed of movement of subjects in a queue, baseline level 410 may include standing and walking. However, number of adverse levels 412 may include, for example, running. Because running falls under number of adverse levels 412, running in the context of subjects who are queuing may be considered one of set of pre-selected event indicators 221 in FIG. 2. Thus, any instance of this particular indicator may be detected by detector 215 in FIG. 2 as one of number of indicator instances 234 in FIG. 2. For example, detector 215 in FIG. 2 may process monitoring data 220 that may include imaging data of subjects 201 in FIG. 2 queuing. Detector 215 may identify any instance of behavior that falls within one of number of adverse levels 412 for behavior category 406 as one of number of indicator instances 234 in FIG. 2.

In other illustrative examples, indicator scheme 400 for set of pre-selected event indicators 221 may take the form of indicator categories 413. Indicator categories 413 may include physical responses 414, facial gestures 416, types of gait 418, changes in pedestrian traffic flow 420, audible expressions 422, physiological responses 424, or some other type of reaction category that is known to be exhibited by one or more types of subjects in response to event of interest 204 in FIG. 2.

Physical responses 414 may include, for example, without limitation, an uncontrolled body spasm, a person falling to the ground, a person covering his or her face with his or her hands, a person holding his or her nose, a person holding his or her clothing over his or her face, some other type of ambulatory mannerism, or some other type of physical response. Facial gestures 416 may include, for example, but is not limited to, squinting, tearing, or some other type of facial gesture.

Types of gait 418 may include, for example, but is not limited to, a particular type of walking, a speed of walking, or some other type of gait. Changes in pedestrian traffic flow 420 may include, for example, without limitation, a rapid transition from walking to running by one or more persons, a cessation of walking, a sudden change in the direction in which a majority of subjects are headed, or some other type of change in pedestrian traffic flow. Audible expressions 422 may include, for example, without limitation, coughing, loud yelling, screaming, crying, choking, audible cries for help, or some other type of audible expression. Physiological responses 424 may include, for example, without limitation, pupil dilation, changes in skin color, changes in body temperature, vomiting, sneezing, or some other type of physiological response.

The illustrations of environment 200 and event detection system 202 in FIG. 2, surveillance system 214 in FIGS. 2-3, and set of pre-selected event indicators 221 and indicator scheme 400 in FIG. 4 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In other illustrative examples, detector 215 and analyzer 216 may not be considered separate but may be implemented together. For example, analyzer 216 may be implemented as part of detector 215 in other cases. In another example, detector 215 may be implemented as part of analyzer 216.

In other illustrative examples, indicator categories 413 may include other categories in addition to or in place of the ones described above. For example, indicator categories 413 may include vocalization volume levels, body positions, number of subjects, or a combination thereof.

Figure 5:
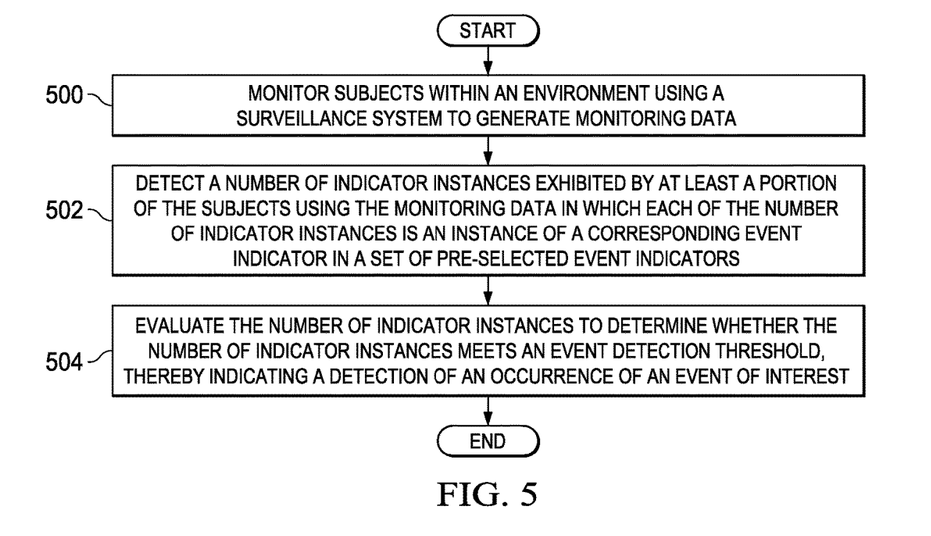
FIG. 5 is an illustration of a process for detecting an event of interest in the form of a flowchart in accordance with an illustrative embodiment.

Turning now to FIG. 5, an illustration of a process for detecting an event of interest is depicted in the form of a flowchart in accordance with an illustrative embodiment. The process illustrated in FIG. 5 may be implemented using event detection system 202 in FIG. 2.

The process may begin by monitoring subjects within an environment using a surveillance system to generate monitoring data (operation 500). A number of indicator instances exhibited by at least a portion of the subjects may be detected using the monitoring data in which each of the number of indicator instances is an instance of a corresponding event indicator in a set of pre-selected event indicators (operation 502). The number of indicator instances may be evaluated to determine whether the number of indicator instances meets an event detection threshold, thereby indicating a detection of the occurrence of an event of interest (operation 504), with the process terminating thereafter.

Figure 6:
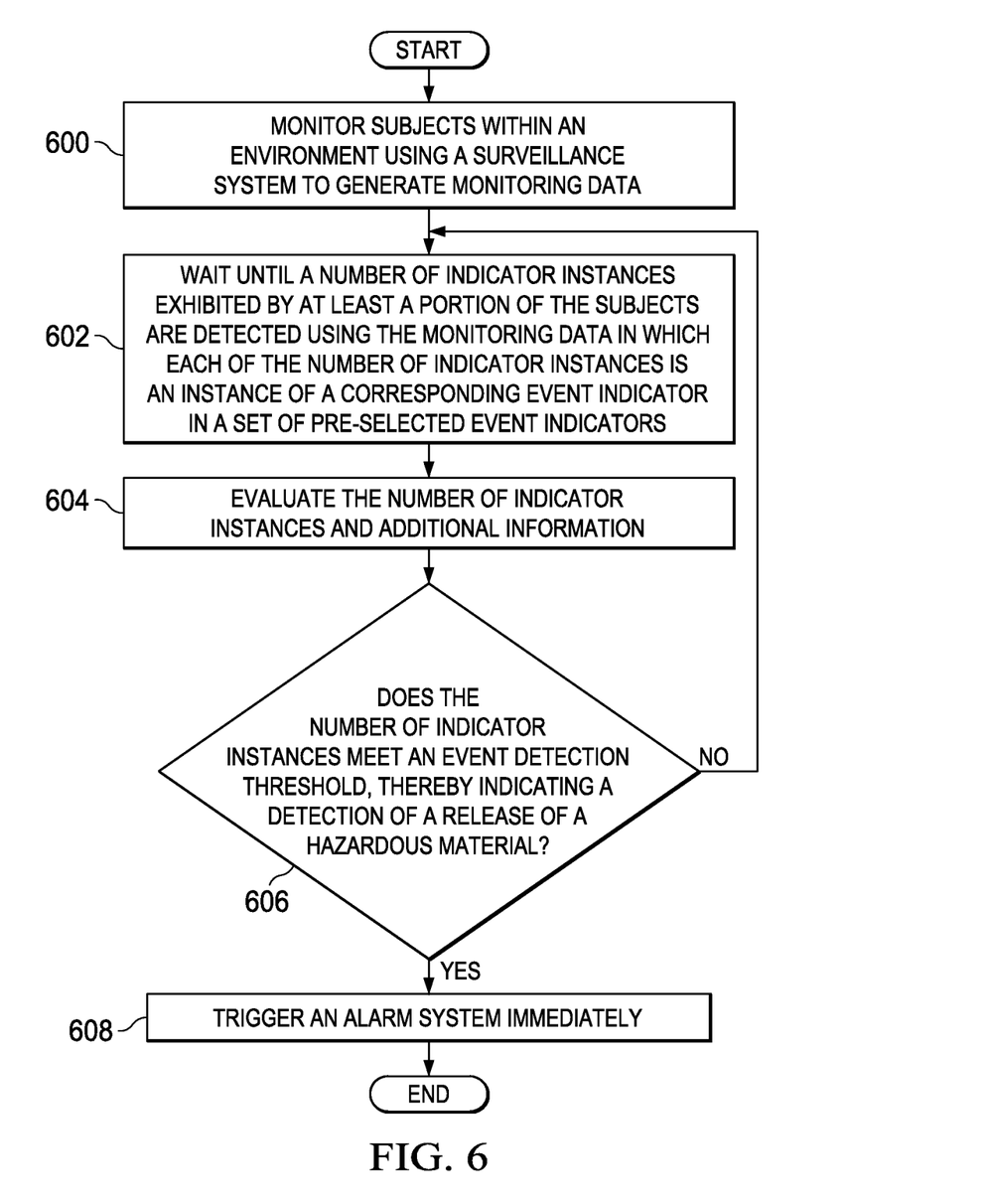
FIG. 6 an illustration of a process for detecting a release of a hazardous material in the form of a flowchart in accordance with an illustrative embodiment.

Turning now to FIG. 6, an illustration of a process for detecting a release of a hazardous material is depicted in the form of a flowchart in accordance with an illustrative embodiment. The process illustrated in FIG. 6 may be implemented using hazardous material detection system 212 in FIG. 2.

The process may begin by monitoring subjects within an environment using a surveillance system to generate monitoring data (operation 600). Operation 600 may be performed continuously or periodically, depending on the implementation. Subjects within environment may be monitored for the purpose of looking for signs of the occurrence of a release of hazardous material within, around, or in proximity to the environment.

Depending on the implementation, monitoring data 220 may be generated continuously, periodically, or both. Monitoring data 220 that is generated periodically may be generated in response to, for example, without limitation, the lapse of a period of time or the occurrence of a pre-selected event.

Next, the process may wait, for example, until a number of indicator instances exhibited by at least a portion of the subjects are detected using the monitoring data in which each of the number of indicator instances is an instance of a corresponding event indicator in a set of pre-selected event indicators (operation 602). Thereafter, the number of indicator instances, along with additional information, may be evaluated (operation 604).

A determination is then made as to whether at least a portion of the number of indicator instances meets an event detection threshold, thereby indicating a detection of a release of a hazardous material (operation 606). If at least a portion of the number of indicator instances do not meet the event detection threshold, the process returns to operation 602 described above. Otherwise, an alarm system is immediately triggered (operation 608), with the process terminating thereafter.

In other illustrative examples, an alert may be generated immediately in operation 608 instead of the triggering of the alarm system. In still other illustrative examples, a number of commands may be immediately generated and sent to an alert generator such that an alert may be generated in operation 608 instead of the triggering of the alarm system.

Figure 7:
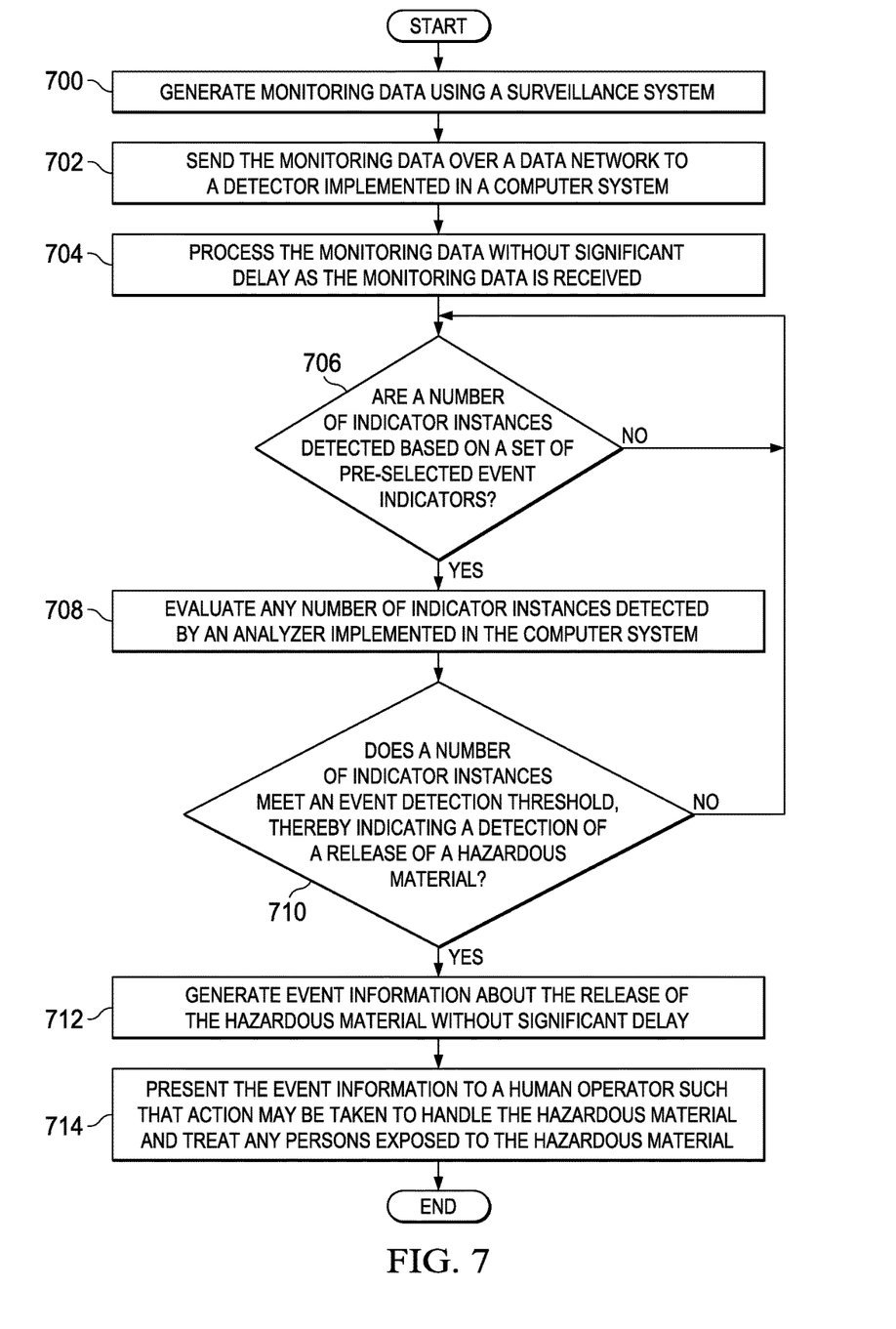
FIG. 7 is an illustration of a process for detecting a release of a hazardous material in the form of a flowchart in accordance with an illustrative embodiment.

Turning now to FIG. 7, an illustration of a process for detecting a release of a hazardous material is depicted in the form of a flowchart in accordance with an illustrative embodiment. The process illustrated in FIG. 7 may be implemented using hazardous material detection system 212 in FIG. 2.

The process may begin by generating monitoring data using a surveillance system (operation 700). Next, the monitoring data is sent over a data network to a detector implemented in a computer system (operation 702). The monitoring data is processed by the detector without significant delay as the monitoring data is received (operation 704). In this illustrative example, operations 700, 702, and 704 may be continuously performed throughout the process described in FIG. 7.

As operations 700, 702, and 704 are performed, a determination is made as to whether any indicator instances have been detected based on a set of pre-selected event indicators (operation 706). If no indicator instances have been detected, the process returns to operation 706. Otherwise, any number of indicator instances detected is evaluated by an analyzer implemented in the computer system (operation 708).

A determination may then be made as to whether the number of indicator instances meets the event detection threshold, thereby indicating a detection of a release of a hazardous material (operation 710). If a determination is made that the event detection threshold has not been met, the process returns to operation 706 as described above. Otherwise, if the event detection threshold has been met, event information about the release of the hazardous material is generated without significant delay (operation 712). The event information may be presented to a human operator such that action may be taken to handle the hazardous material and treat any subjects exposed to the hazardous material (operation 714), with the process terminating thereafter.

In operation 712, the event information may include, for example, an alert indicating that a hazardous material has been released. The alert may be visually or audibly presented to the human operator, depending on the implementation. In another example, the event information may include current video imagery of the impacted area in the environment. In yet another example, the event information may include audio of the current activity in the impacted area in the environment.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 8:
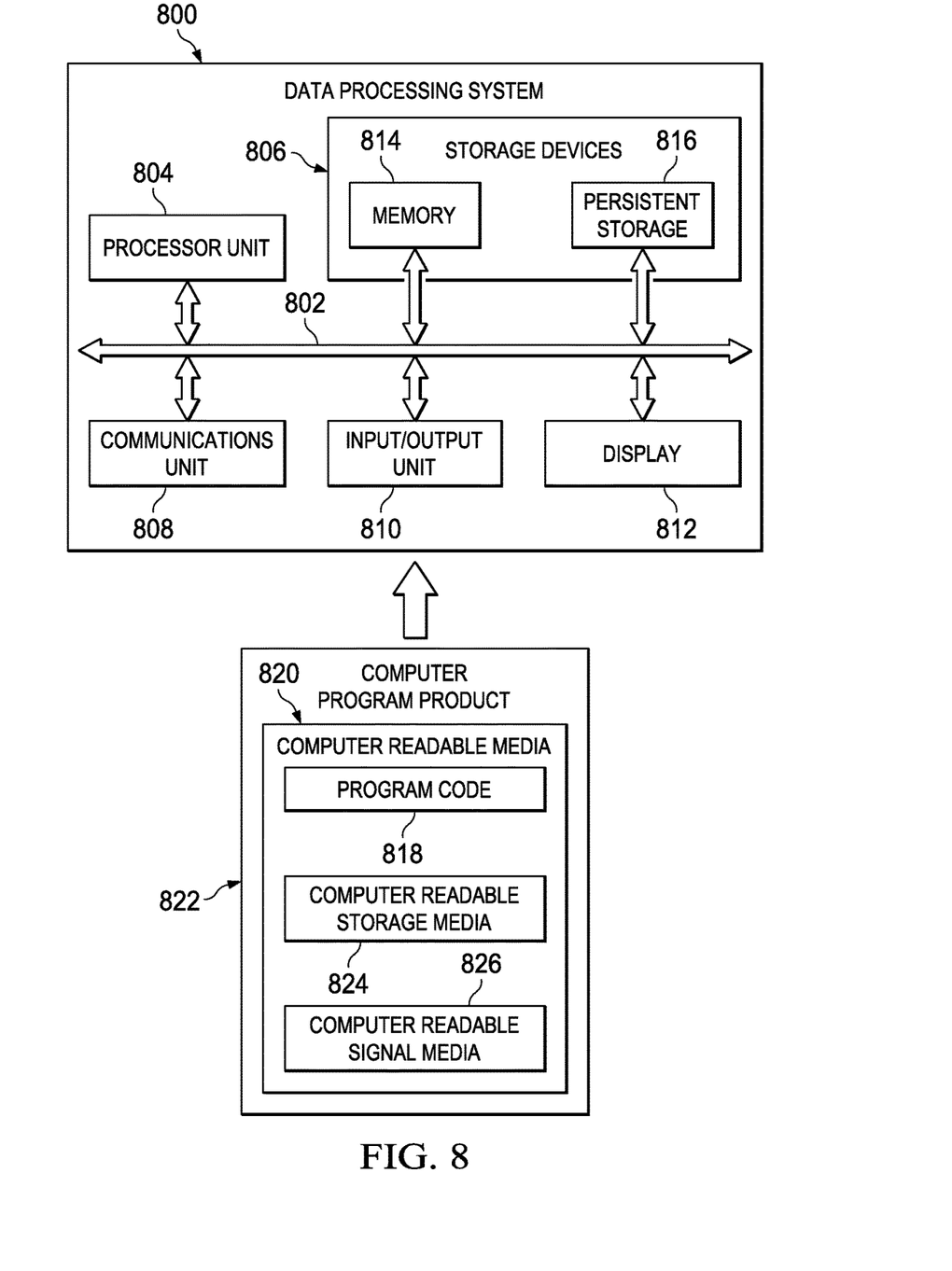
FIG. 8 is an illustration of a data processing system in the form of a block diagram in accordance with an illustrative embodiment.

Turning now to FIG. 8, an illustration of a data processing system in the form of a block diagram is depicted in accordance with an illustrative embodiment. Data processing system 800 may be used to implement computer system 108 in FIG. 1 or computer system 218 in FIG. 2. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise at least one of a number of processors, a multi-processor core, or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications and programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems, devices, or both. Communications unit 808 may provide communications using physical communications links, wireless communications links, or both.

Input/output unit 810 allows input to be received from and output to be sent to other devices connected to data processing system 800. For example, input/output unit 810 may allow user input to be received through a keyboard, a mouse, some other type of input device, or a combination thereof. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, or some other type of signal that can be transmitted over physical communications links, wireless communications links, or both.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a surveillance system that monitors subjects within an environment to generate monitoring data;
   a detector that analyzes the monitoring data to identify a number of indicator instances exhibited by at least a portion of the subjects, wherein each of the number of indicator instances is an instance of a corresponding event indicator in a set of pre-selected event indicators; and
   an analyzer that evaluates the number of indicator instances identified with respect to a set of criteria to determine whether at least a portion of the number of indicator instances meets an event detection threshold, thereby indicating a detection of an occurrence of an event of interest;
   wherein the set of criteria include that a certain number of the indicator instances detected occurred within a selected period of time, that a certain number of the indicator instances detected occurred within a certain distance relative to each other, and that a certain number of indicator instances were detected for each of multiple pre-selected event indicators;
   wherein each of the multiple pre-selected event indicators comprise a reaction or a response that is physical, physiological, psychological, or a combination pf physical, physiological, and psychological; and
   wherein the event of interest is a presence of a hazardous material in a location relative to the environment and wherein the at least a portion of the subjects exhibit the number of indicator instances in response to exposure to the hazardous material.

2. The apparatus of claim 1, wherein a determination that the at least a portion of the number of indicator instances meets the event detection threshold enables a triggering of an alarm system such that the alarm system is triggered without significant delay after the occurrence of the event of interest.

3. The apparatus of claim 1 further comprising:
   a data store that stores additional information that the analyzer uses in evaluating whether the at least a portion of the number of indicator instances meets the event detection threshold.

4. The apparatus of claim 3, wherein the additional information includes at least one of time and date information, geospatial location information, weather information, historical patterns of human indicators, or historical pedestrian traffic flow.

5. The apparatus of claim 1, wherein the surveillance system comprises at least one of a visual surveillance system, an audio surveillance system, a temperature sensor system, a gait surveillance system, an air quality sensor system, a physiological response detection system, or a facial recognition system.

6. The apparatus of claim 5, wherein the visual surveillance system comprises at least one of an imaging system, a video camera, an electro-optical imaging system, an infrared imaging system, or an ultraviolet imagining system.

7. The apparatus of claim 5, wherein the audio surveillance system comprises at least one of an acoustic transducer or a microphone.

8. The apparatus of claim 1 further comprising:
an alert generator that generates an alert in response to a determination that the at least a portion of the number of indicator instances meets the event detection threshold.

9. The apparatus of claim 1, wherein the analyzer generates an alert in response to a determination that the at least a portion of the number of indicator instances meets the event detection threshold and wherein the alert is selected from one of a visual alert, an audible alert, or an alert message.

10. The apparatus of claim 9, wherein the alert is generated after the occurrence of the event of interest without significant delay.

11. The apparatus of claim 1, wherein a source of the hazardous material is selected from one of a chemical source, a radiological source, a biological source, a nuclear source, a weapon, and an explosive device.

12. The apparatus of claim 1, wherein the event detection threshold comprises at least one of an algorithm that sorts, ranks, and evaluates the number of indicator instances according to the set of criteria to determine whether the event detection threshold has been met, and a minimum number of subjects being associated with the number of indicator instances, and that some number of indicator instances occur within close temporal or physical proximity relative to each other.

13. The apparatus of claim 1, wherein the physical response comprises one or more of an uncontrolled body spasm, a person falling to the ground, a person covering his or her face with his or her hands, a person holding his or her nose, a person holding his or her clothing over his or her face, squinting, tearing, a particular type of walking, a speed of walking, or some other type of gait, a rapid transition from walking to running by one or more persons, a cessation of walking, a sudden change in direction in which a majority of subjects are headed, or some other type of change in pedestrian traffic flow, coughing, loud yelling, screaming, crying, choking, audible cries for help.

14. The apparatus of claim 1, wherein the physiological response comprises at least one of a pupil dilation, a change in skin color, a change in a body temperature, vomiting, and sneezing.

15. A hazardous material detection system comprising:
a surveillance system that monitors subjects within an environment to generate monitoring data;
a detector that detects a number of indicator instances exhibited by at least a portion of the subjects using the monitoring data, wherein each of the number of indicator instances is an instance of a corresponding event indicator in a set of pre-selected event indicators; and
an analyzer that evaluates the number of indicator instances with respect to a set of criteria and additional information to determine whether at least a portion of the number of indicator instances meets an event detection threshold, thereby indicating a detection of a release of a hazardous material;
wherein the set of criteria include that a certain number of the indicator instances detected occurred within a selected period of time, that a certain number of the indicator instances detected occurred within a certain distance relative to each other, that a certain number of indicator instances were detected for each of multiple pre-selected event indicators;
wherein each of the multiple pre-selected event indicators comprise a reaction or a response that is physical, physiological, psychological, or a combination pf physical, physiological, and psychological; and
wherein an event of interest is a presence of a hazardous material in a location relative to the environment and wherein the at least a portion of the subjects exhibit the number of indicator instances in response to exposure to the hazardous material.

16. The hazardous material detection system of claim 15 further comprising:
an alarm system that is triggered without significant delay after exposure of the at least a portion of the subjects to the hazardous material in response to a determination that the at least a portion of the number of indicator instances meets the event detection threshold.

17. The hazardous material detection system of claim 15, wherein the surveillance system comprises at least one of a visual surveillance system, an audio surveillance system, a temperature sensor system, a gait surveillance system, an air quality sensor system, and a physiological response detection system, and a facial recognition system.

18. A method for detecting an occurrence of an event of interest, the method comprising:
monitoring subjects within an environment using a surveillance system to generate monitoring data;
detecting a number of indicator instances exhibited by at least a portion of the subjects using the monitoring data, wherein each of the number of indicator instances is an instance of a corresponding event indicator in a set of pre-selected event indicators; and
evaluating the number of indicator instances with respect to a set of criteria to determine whether at least a portion of the number of indicator instances meets an event detection threshold, thereby indicating a detection of the occurrence of an event of interest;
wherein the set of criteria include that a certain number of the indicator instances detected occurred within a selected period of time, that a certain number of the indicator instances detected occurred within a certain distance relative to each other, and that a certain number of indicator instances were detected for each of multiple pre-selected event indicators;
wherein each of the multiple pre-selected event indicators comprise a reaction or a response that is physical, physiological, psychological, or a combination pf physical, physiological, and psychological; and
wherein the event of interest is a presence of a hazardous material in a location relative to the environment and wherein at least a portion of the subjects exhibit the number of indicator instances in response to exposure to the hazardous material.

19. The method of claim 18 further comprising:
triggering an alarm system without significant delay after the occurrence of the event of interest in response to a determination that the number of indicator instances meets the event detection threshold.

20. The method of claim 18, wherein evaluating the number of indicator instances comprises:
evaluating the number of indicator instances and additional information stored in a data store to determine whether the number of indicator instances meets the event detection threshold, wherein the additional information includes at least one of time and date information, geospatial location information, weather information, historical patterns of human indicators, or historical pedestrian traffic flow.

21. The method of claim 18, wherein monitoring the subjects within the environment using the surveillance system to generate the monitoring data comprises:
generating at least one of imaging data, audio data, temperature data, gait data, air quality data, physiological reaction data, or facial data using the surveillance system.

22. The method of claim 18, wherein detecting the number of indicator instances comprises:
analyzing the monitoring data using at least one of video analytics software or audio analytics software to detect the number of indicator instances.

* * * * *

UNITED STATES PATENT AND TRADEMARK OFFICE
CERTIFICATE OF CORRECTION

PATENT NO.        : 9,811,989 B2
APPLICATION NO.   : 14/501378
DATED             : November 7, 2017
INVENTOR(S)       : Thomas Robert Austin Page 1 of 1

It is certified that error appears in the above-identified patent and that said Letters Patent is hereby corrected as shown below:

In the Claims

Column 18, Line 50, change "pf" to --of--
Column 20, Line 18, change "pf" to --of--
Column 20, Line 61, change "pf" to --of--

Signed and Sealed this
Twenty-seventh Day of March, 2018

Andrei Iancu
*Director of the United States Patent and Trademark Office*